(12) United States Patent
Brown

(10) Patent No.: US 6,839,825 B1
(45) Date of Patent: Jan. 4, 2005

(54) METHOD AND APPARATUS FOR LOGICALLY EXPANDING THE WIDTH OF MEMORY

(75) Inventor: David A. Brown, Carp (CA)

(73) Assignee: Mosaid Technologies, Inc., Kanata, Ontario (CA)

( * ) Notice: Subject to any disclaimer, the term of this patent is extended or adjusted under 35 U.S.C. 154(b) by 563 days.

(21) Appl. No.: 09/886,649

(22) Filed: Jun. 21, 2001

Related U.S. Application Data

(60) Provisional application No. 60/294,387, filed on May 30, 2001, provisional application No. 60/258,436, filed on Dec. 27, 2000, and provisional application No. 60/212,966, filed on Jun. 21, 2000.

(51) Int. Cl.[7] .............................................. G06F 12/00
(52) U.S. Cl. ...................... 711/202; 711/201; 711/171
(58) Field of Search ......................... 345/544; 711/201, 711/202

(56) References Cited

U.S. PATENT DOCUMENTS 5,479,401 A    12/1995   Bitz et al. ................... 370/60.1
5,680,161 A  * 10/1997   Lehman et al. .............. 345/531
5,857,196 A     1/1999   Angle et al. ................. 707/102

FOREIGN PATENT DOCUMENTS

WO     WO 99/14906      3/1999

OTHER PUBLICATIONS

Degermark Mikael et al., "Small Forwarding Tables for Fast Routing Lookups", Department of Computer Science and Electrical Engineering, Luleå University of Technology, Sweden, SigComm '97 Cannes, France pp. 3–14 (1997).

* cited by examiner

Primary Examiner—Mano Padmanabhan
Assistant Examiner—Paul Baker
(74) Attorney, Agent, or Firm—Hamilton, Brook, Smith & Reynolds, P.C.

(57) ABSTRACT

A method and apparatus for minimizing memory required for storing non-binary width data structures is disclosed. The non-binary width data structure is segmented into plural segments. The segments are stored in a plurality of memory blocks. Mapper logic maps a logical address to a physical address in the memory blocks to access non-binary width entries in the non-binary width data structure stored in the memory blocks.

23 Claims, 8 Drawing Sheets

METHOD AND APPARATUS FOR LOGICALLY EXPANDING THE WIDTH OF MEMORY

RELATED APPLICATION(S)

This application claims the benefit of U.S. Provisional Application Nos. 60/212,966 filed on Jun. 21, 2000, 60/258,436 filed on Dec. 27, 2000, and 60/294,387 filed on May 30, 2001. The entire teachings of the above applications are incorporated herein by reference.

BACKGROUND OF THE INVENTION

An Application Specific Integrated Circuit ("ASIC") can be implemented in either a semi-custom gate array or a full-custom gate array. In a semi-custom gate array, embedded memory is implemented as blocks of fixed binary sized memory blocks or macro cells. In a binary sized macro cell the number of columns and rows are a multiple of a power of two. In a full custom gate array embedded memory is implemented with custom macro cells. Custom macro cells are designed using compilers that allow embedded memory to have a non-binary number of rows and columns.

The design of a semi-custom ASIC requires less effort but requires that embedded memory be implemented in fixed size binary macro cells. Many applications store non-binary width data structures in memory. Storing non-binary width structures in a fixed size binary width memory requires including more memory than necessary in the ASIC.

FIG. 1A illustrates a prior art binary macro cell 100 for storing a non-binary width data structure including sixteen non-binary (21-bit) entries. The 16 Mega ($2^{24}$) bit memory macro cell includes $2^{15}$ (32K) logical rows. Each logical row is $2^9$ (512) bits as $2^8$ (256) bit logical rows would be insufficient to store sixteen 21-bit mapper entries (336 bits). With sixteen entries per logical row and 32K logical rows, the macro cell 100 can store 512K ($2^{19}$) entries. By storing sixteen entries per logical row, a logical row is indexed by the 15 most significant bits of a 19-bit pointer and an entry within the indexed logical row is identified by the lower 4-bits of the 19-bit pointer. Thus, a 15-bit base pointer can be stored to index a logical row and the 19-bit pointer can be computed by adding a 4-bit offset to the 15-bit base pointer. Memory for storing pointers to entries stored in the macro cell 100 is therefore reduced by storing 15-bit base pointers for blocks of 16 entries per logical row instead of storing a separate 19-bit pointer for each entry in the macro cell 100.

As shown, the macro cell 100 can store sixteen non-binary (21-bit width) entries in the first 336 bits of each 512-bit wide logical row. 10 Mega bits (32K×336 bits) of the 16 Mega bits memory are used to store the sixteen 21-bit wide entries and 6 Mega bits (32K×176 bits) of the 16 Mega bits memory block are not used.

Thus, almost thirty-five percent (6M/16M) of the 16M fixed size binary macro cell shown in FIG. 1A is not used when the binary macro cell stores a non-binary width data structure.

SUMMARY OF THE INVENTION

We present a method and apparatus for minimizing memory required for storing non-binary width data structures. The non-binary width data structure is segmented into plural segments. The segments are physically mapped into a binary memory structure smaller than would be required for the non-binary width data structure without segmenting and a logical address is mapped into the physically arranged plural segments.

The memory comprises plural segments which segment the non-binary width data structure and physically map the segmented non-binary width data structure into a binary memory structure. The binary memory structure is smaller than would be required for the non-binary width data structure without segmenting. Mapper logic maps a logical address into the physically arranged plural segments. The segments may be the same size.

In one embodiment, the memory includes a first binary memory block and a second binary memory block. The first binary memory block has $2^n$ logical rows. The second memory block has $2^{n-1}$ logical rows. A logical row in the first binary memory block stores a portion of the non-binary width data structure. A logical row in the second binary memory block stores a first other portion of the non-binary width data structure for the first $2^{n-1}$ logical rows of the first binary memory block and a second other portion of the non-binary width data structure for the second $2^{n-1}$ logical rows of the first binary memory block. Mapper logic maps a logical address identifying a logical row and an entry in the logical row to a physical address for the entry stored in a single location in the first binary memory block or the second binary memory block. A multiplexor selects the entry in the logical row.

The portion of the non-binary width data structure stored per logical row in the first binary memory block stores twelve entries, the first other portion stored per logical row in the second binary memory block stores four entries and the second other portion stored mer logical row in the second binary memory stores four entries. The width of the entry is 21-bits, the non-binary data structure stores 16 entries and n is 15. Twelve of the sixteen entries in the non-binary width data structure are stored in the first binary memory block and the other four entries are stored in the first other portion or the second other portion of the second binary memory block.

The first binary memory block and the second binary memory block may be binary macro cells or portions of a macro cell.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
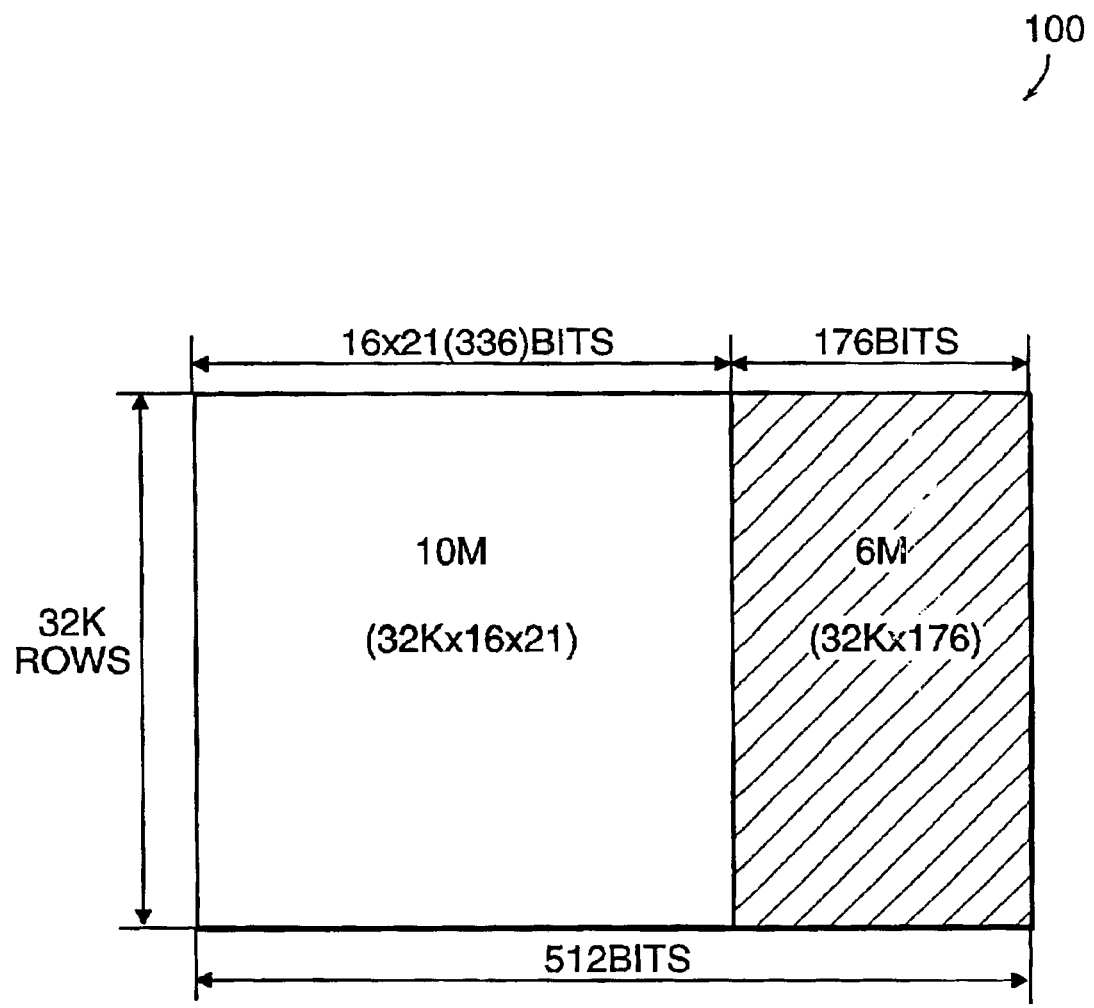
FIG. 1A illustrates a prior art binary macro cell 100 for storing a non-binary width data structure including sixteen non-binary (21-bit) entries.
Figure 1B:
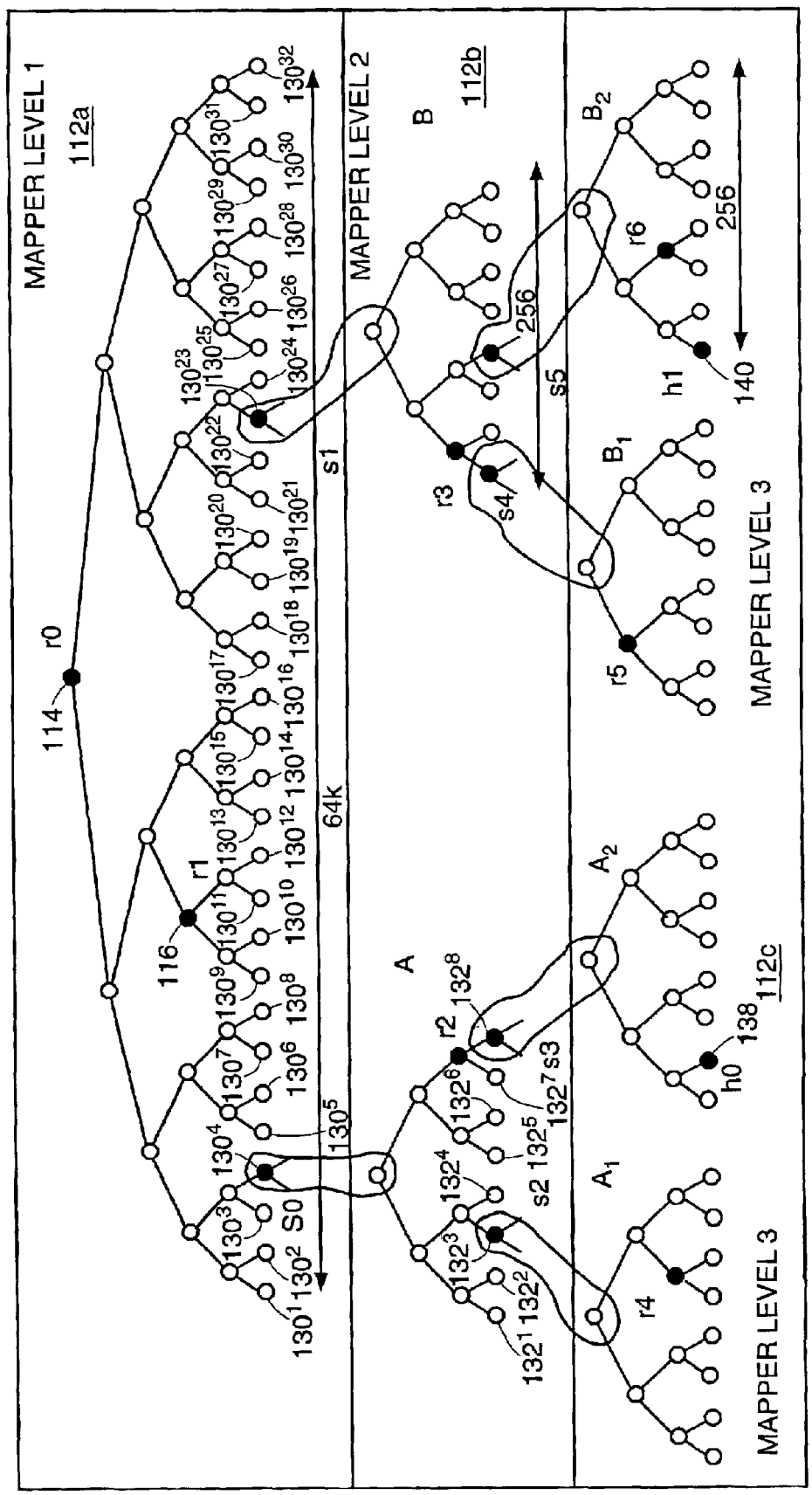
FIG. 1B illustrates a 32-level binary tree representation of the nodes representing non-binary width entries stored in a non-binary width data structure in the macro cell shown in FIG. 1A.

FIG. 1B illustrates a 32-level binary tree representation of nodes representing non-binary width entries stored in a non-binary width data structure in the macro cell 100 shown in FIG. 1A. A 32-bit key can be represented as a 32-level binary tree. A 32 level binary tree implementation requires 32 searches to search bit by bit down to 32 levels. To reduce the number of searches, the 32 levels of the binary tree are divided into mapper levels 112a–c. Mapper level 1 112a includes the first 16 of the 32 levels of the binary tree. However, for simplicity only 5 of the 16 levels are shown in FIG. 1B. Mapper level_2 112b includes the next 8 levels of the 32-level binary tree, with three of the eight levels shown in FIG. 1B. Mapper level_3 112c includes the last 8 levels of the 32-level binary tree, with three of the eight levels shown in FIG. 1B. Each mapper level 112a–c includes a plurality of nodes. Dividing the 32-levels such that 16-levels are in mapper level_1 112a and 8-levels in mapper levels 112b–c appears to be optimal in the current memory technology; however, the invention is not limited to this configuration.

Figure 1C:
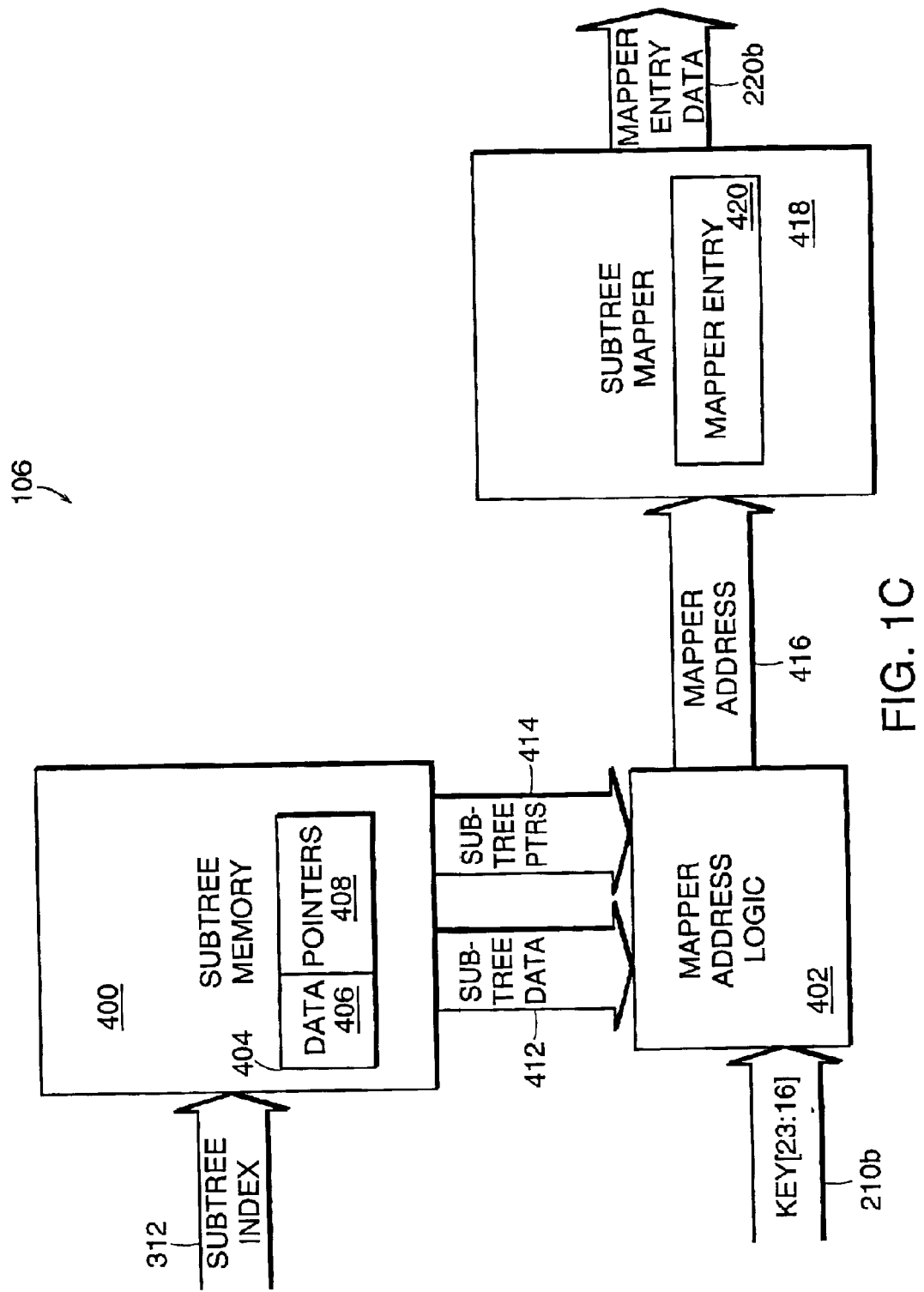
FIG. 1C illustrates logic for selecting a mapper entry corresponding to a node in the bottom level of mapper level$_{-2\ shown\ in\ FIG.\ 1B}$.

FIG. 1C illustrates logic implemented in a lookup table for selecting a mapper entry 420 corresponding to a node in the bottom level of mapper level_2 112b (FIG. 1B). The mapper entry 420 stores a route for the node or a pointer to a subtree in the next mapper level. The logic for selecting the mapper entry 420 includes a subtree memory 400 and mapper address logic 402. A subtree mapper 418 includes mapper entries 420 for storing routes and subtree entry descriptors. The stored routes and subtree entry descriptors correspond to the nodes in mapper level_2 112b (FIG. 1B). The logic is described for a search for route r2 in subtree A in mapper level_2 112b. The search for a mapper entry storing a route index for r2 begins with the 16 Most Significant Bits ("MSBs") of the 32-bit key in mapper level_1 112a (FIG. 1B). The search results in mapper entry 420 corresponding to node 130[4] at the bottom level of mapper level_1 which stores a subtree index 312 labeled s0 for subtree A in mapper level_2 112b (FIG. 1B).

The search continues in subtree A in the next level mapper 112b (FIG. 1B) by forwarding the subtree index 312 for subtree s0 to the subtree memory 400. The subtree memory 400 includes a subtree entry 404 indexed by the subtree index 312. The subtree entry 404 includes a data field 406 and a pointers field 408.

Returning to FIG. 1B, the subtree entry 404 corresponds to the bottom level of subtree A shown in mapper level_2 112b. If mapper level_2 112b has eight levels, the bottom level of each subtree (not shown) has a maximum of 256 routes, one for each of the $2^8$ (256) nodes in the subtree.

Continuing with FIG. 1C, the subtree entry 404 provides access to 256 possible routes one for each node on the bottom level of subtree A. The routes are stored in mapper entries 420 in the subtree mapper 418. To provide access to 256 possible routes, a dense subtree descriptor is stored in the data field 406. A dense subtree descriptor includes a bit for each node at the bottom level of the subtree. Thus, for an 8-level subtree, the data field 406 is 256 bits wide, providing one bit for each node at the bottom level of the subtree. A bit in the data field 406 is set to '0' if the route for the previous node is to be used and set to '1' to use the next route stored in the subtree mapper 418. The subtree mapper 418 has $2^{19}$ (512K) locations for storing mapper entries 420, with $2^4$ (16) mapper entries 420 stored in each of the $2^{15}$ (32K) logical rows. The mapper address 416 is nineteen bits to index the $2^{19}$ (512K) mapper entries 420.

A mapper entry 420 is 21-bits wide. The pointers field 408 is 256 bits wide to allow for the storage of sixteen 16-bit pointers. Each pointer stores a 15-bit base address for a block of 16 contiguous mapper entries 420 in the subtree mapper 418. Thus, the pointers field 408 can indirectly provide a pointer to a mapper entry 420 in the subtree mapper 418 for each node in the bottom level of subtree A. The data field 406, pointers field 408 and mapper entry 420 are described in U.S. patent application Ser. No. 09/733,627 entitled "Method and Apparatus for Longest Match Address Lookup," filed Dec. 8, 2000 by David A. Brown which issued as U.S. Pat. No. 6,691,218 on Feb. 10, 2004 incorporated herein by reference in its entirety.

The subtree data 412 stored in the data field 406 and the subtree pointer 414 stored in the pointers field 408 are forwarded to the mapper address logic 402. The mapper address logic 402 also receives the next eight bits of the 32-bit key 210b. The mapper address logic 402 computes the mapper address 416 dependent on the next eight bits of the key 210b, and the subtree data 412 and subtree pointers 414 stored in the subtree entry 404 for subtree A.

Figure 2A:
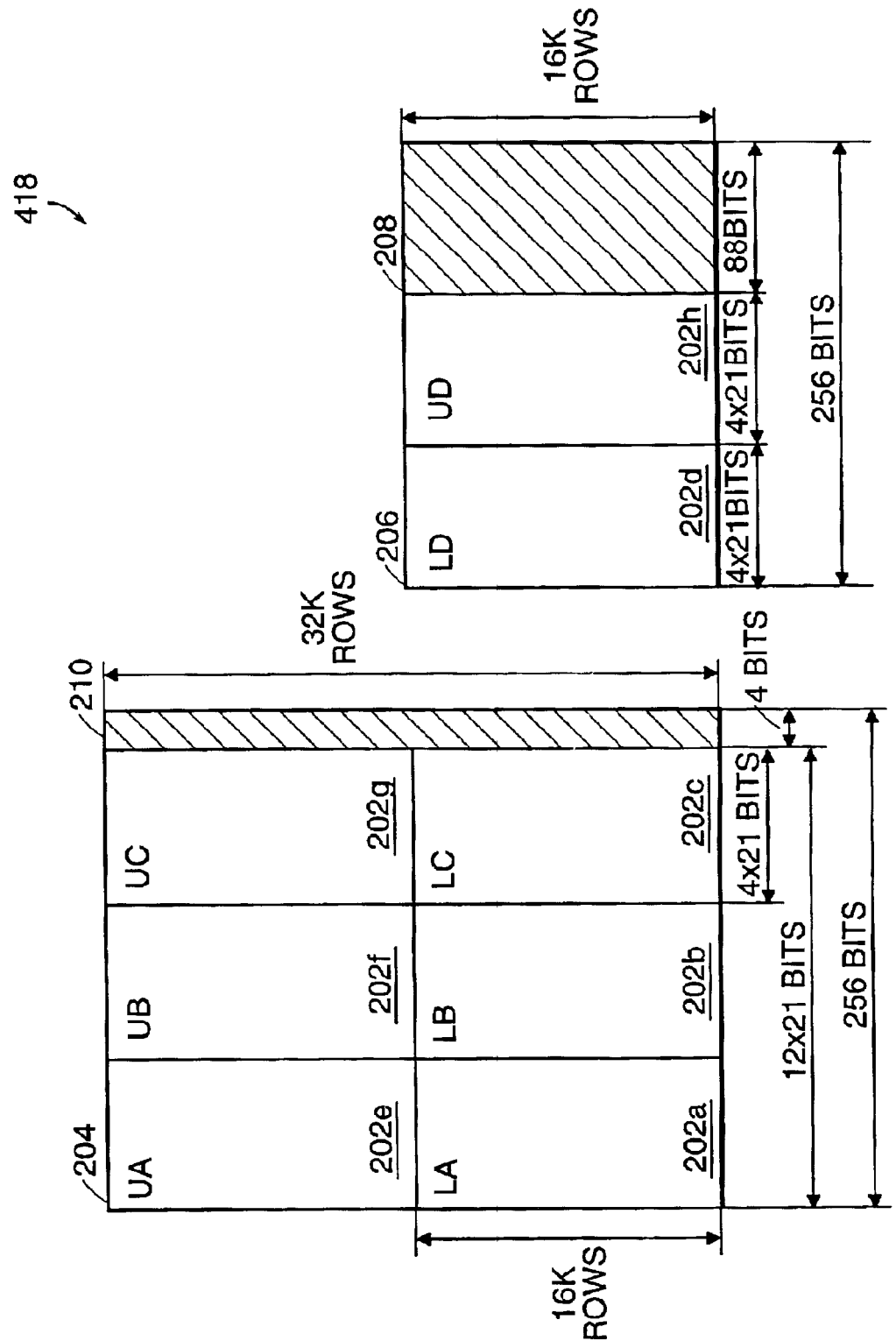
FIG. 2A illustrates the subtree mapper shown including two binary memories for storing a non-binary data structure according to the principles of the present invention

FIG. 2A illustrates the subtree mapper 418 shown in FIG. 1C including two binary memory blocks 204, 206 for storing a non-binary data structure according to the principles of the present invention. The binary memory blocks 204, 206 can be binary macro cells. In one embodiment, the subtree mapper 418 includes binary macro cell 204 and binary macro cell 206. Binary macro cell 204 stores $2^{23}$ (8M) bits organized as $2^{15}$ (32K) logical rows with $2^8$ (256) bits per logical row. Binary macro cell 206 stores $2^{22}$ (4M) bits organized as $2^{14}$ (16K) logical rows with $2^8$ (256) bits per logical row. The overall memory required for storing 512K 21-bit mapper entries 420 with sixteen 21-bit mapper entries 420 stored in each of $2^{15}$ logical rows is reduced from the prior art $2^{24}$ (16M) bits to 12M bits.

The invention is described for a data structure including sixteen 21-bit mapper entries 420 but the invention applies to storing any non-binary size data structure in a binary width memory structure. The subtree mapper 418 is logically divided into eight independently addressable logical blocks 202a–h. Each logical block 202a–h has a depth of 16K logical rows and a width of 84 bits for storing four 21-bit mapper entries 420. Logical blocks 202a–c and 202e–g are physically located in binary macro cell 204. Logical blocks 202d and 202h are physically located in binary macro cell 206.

Binary macro cell 204 can store a total of 384K (2×16K× 3×4) 21-bit mapper entries 420. Binary macro cell 206 has $2^{14}$ (16K) logical rows, half the number of logical rows in binary macro cell 204. Binary macro cell 206 and binary macro cell 204 have the same number of bits per logical row (256 bits). Both cells 204, 206 provide storage for twelve 21 bit mapper entries 420 (252 bits of the 256 bits) per logical row, for a total of 192K (12×16K) 21-bit mapper entries 420. The combination of binary macro cell 204 and binary macro cell 206 provides storage for 576K mapper entries.

Figure 2B:
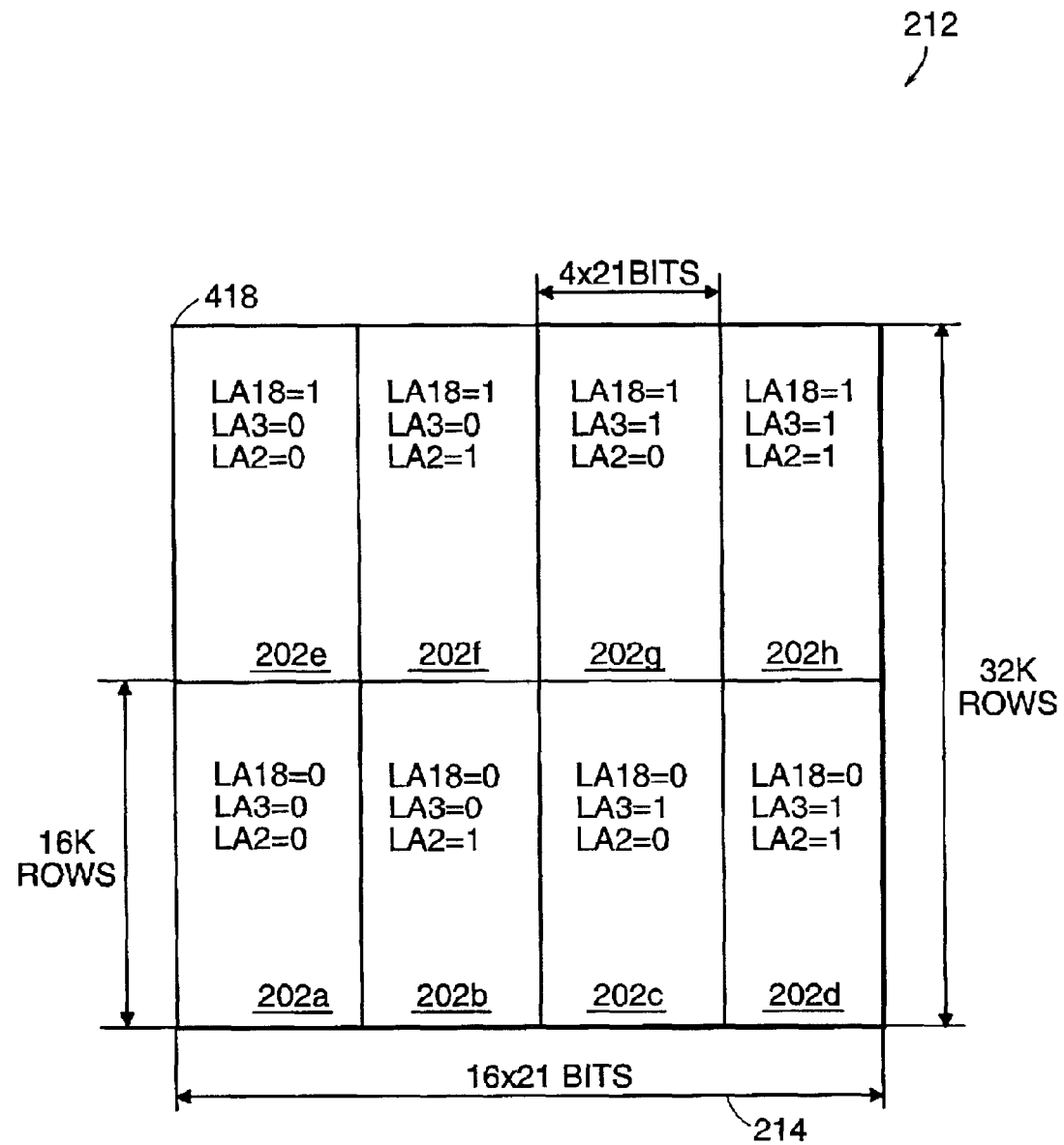
FIG. 2B is a logical view of the memory shown in FIG. 2A.

FIG. 2B is a logical view 212 of the subtree mapper 418 shown in FIG. 2A. The subtree mapper 418 can store 512K ($2^{19}$) mapper entries 420. The logical view of the subtree mapper 418 includes 32K ($2^{15}$) logical rows. Each logical row can store a data structure including sixteen ($2^4$) 21-bit mapper entries 420. The logical view of the subtree mapper 418 is further divided into eight logical blocks 202a–h shown in FIG. 2A.

A 19-bit address (A18:A0) is used to select one of the non-binary 21-bit wide mapper entries 420 stored in the subtree mapper 418. The Most Significant Bit ("MSB") (A18) of the 19-bit address selects group of logical blocks 202*a–d* or group of logical blocks 202*e–h*. For example, if A18 is a logic 'H', the group of logical blocks 202*e–h* is selected, and if A18 is a logic 'L', the group of logical blocks 202*a–d* is selected. A3 and A2 select one of the blocks from the group of selected logical blocks.

A logical row is selected dependent on the state of address bits A17–A4. One of the four 21-bit mapper entries 420 in the selected logical row in the selected logical block 202*a–h* in the selected logical row is selected dependent on the state of address bits A1 and A0.

Figure 3:
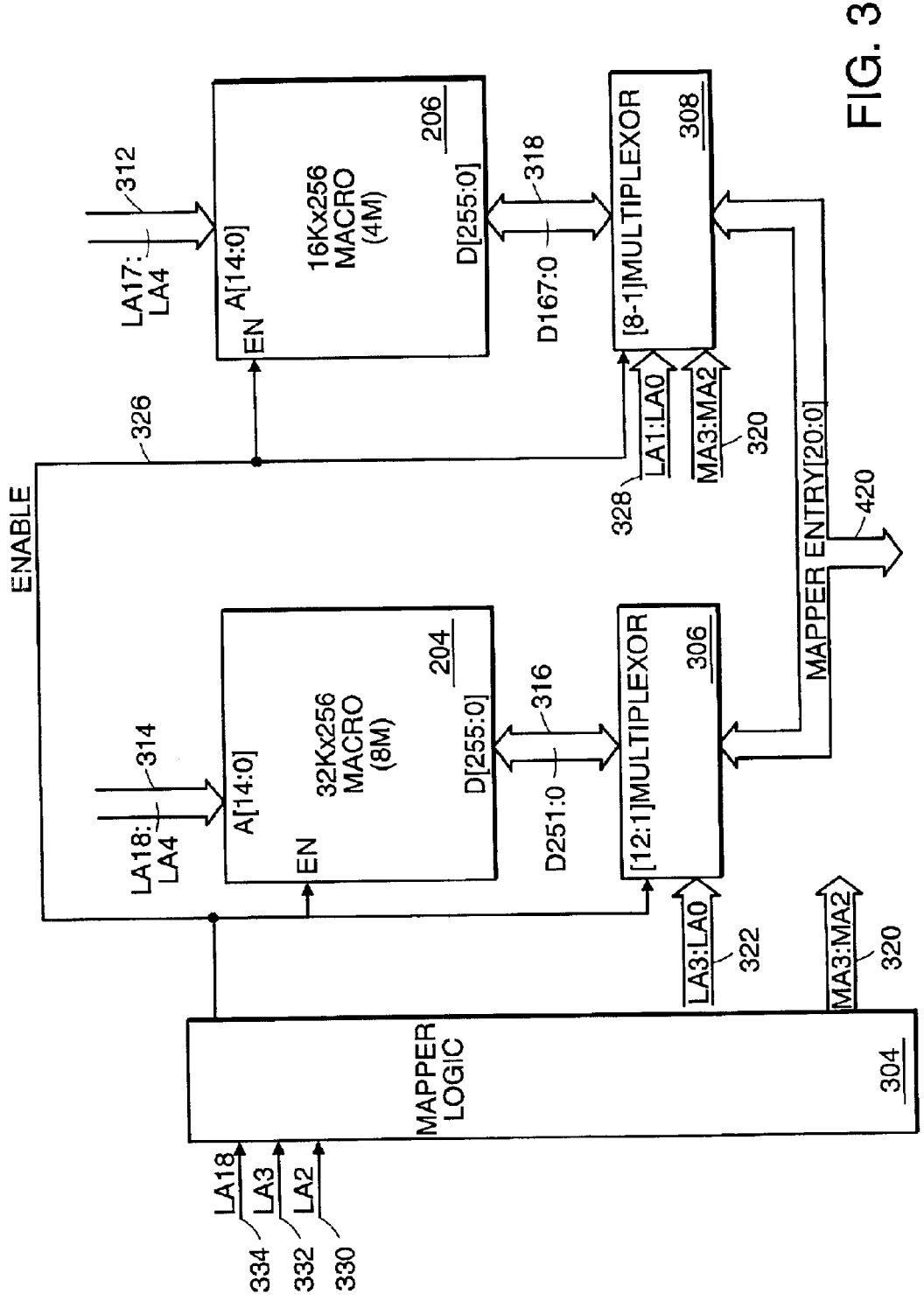
FIG. 3 is an embodiment for mapping the logical view of memory shown in FIG. 2B to the binary memory macro cells shown in FIG. 2A.

FIG. 3 illustrates an embodiment for mapping the logical view of the subtree mapper 418 shown in FIG. 2B to the physical binary macro cells 204, 206 shown in FIG. 2A. In an alternate embodiment discrete fixed sized binary memory devices can be substituted for binary macro cells 204, 206.

Mapper logic 304 maps logical memory addresses LA18–LA0 to physical memory addresses to provide the logical expanded non-binary width view shown in FIG. 2B of physical binary macro cells 204, 206 shown in FIG. 2A. The data structure including 16 non-binary entries is logically stored in a single logical memory row but is physically stored in a first physical macro cell 204 and a second physical macro cell 206.

Nineteen address bits (A18–A0) provide an index for the 512K 21-bit mapper entries 420 (FIG. 1C) stored in binary macro cells 204, 206. The most significant fifteen bits (A18–A4) of the 19-bit mapper address 416 (FIG. 1C) select the data structure stored in one of the 32K ($2^{15}$) logical rows. The least significant four bits of the nineteen bit mapper address (A3:A0) select one of the 16 21-bit mapper entries 420 (FIG. 1C) stored in the selected logical row.

Each logical row 214 (FIG. 2B) can store a data structure including sixteen 21-bit mapper entries 420 (FIG. 1C). Twelve of the 21-bit mapper entries 420 (FIG. 1C) are physically stored in binary macro cell 204 and four of the 21-bit mapper entries 420 (FIG. 1C) are physically stored in binary macro cell 206. Of the four address bits used to select a 21-bit mapper entry 420 (FIG. 1C) in a logical row 214 (FIG. 2B), logical address bits LA3 332 and LA2 330 select the logical block 202*a–h* (FIG. 2B) and logical address bits LA1, LA0 328 select one of the four 21-bit mapper entries 420 (FIG. 1C) in the selected logical block 202*a–h* (FIG. 2B). If logical address bits LA3 332 and LA2 330 are both set to logic 'H', the 21-bit mapper entry 420 (FIG. 1C) is stored in binary macro cell 206. The most significant fourteen bits of the logical address (LA17–LA4 312) select one of the 16K ($2^{14}$) logical rows in binary macro cell 206. Logical address bits, LA3 332 and LA2 330 select binary macro cell 206 or binary macro cell 204. If both LA3 332 and LA2 330 are logic 'H', binary macro cell 206 is enabled, otherwise binary macro cell 204 is enabled.

The state of logical address bit LA18 334 selects a logical block group in the lower half ($2^{14}$) of the $2^{15}$ logical rows or the upper half ($2^{14}$) of the $2^{15}$ logical rows of binary macro cell 204. The lower $2^{14}$ logical rows include logical blocks 202*a–d* (FIG. 2B). The upper $2^{14}$ logical rows include logical blocks 202*e–h* (FIG. 2B). If logical address bit LA18 334 is logic 'L', the group of logical blocks including logical blocks 202*a–d* (FIG. 2B) are selected. Otherwise the group of logical blocks including logical blocks 202*e–h* (FIG. 2B) are selected. Thus, LA18 334 in combination with LA2 332 and LA3 330 selects logical block 202*d* (FIG. 2B) or 202*h* (FIG. 2B). Logical block 202*d* (FIG. 2B) stores four 21-bit mapper entries 420 (FIG. 1C) for a logical row 214 (FIG. 2B) in the higher $2^{14}$ logical rows of binary macro cell 204. Logical block 202*h* (FIG. 2B) stores four 21-bit mapper entries 420 (FIG. 1C) for a logical row 214 (FIG. 2B) in the lower $2^{14}$ logical rows of binary macro cell 204. Mapper logic 304 selects logical block 202*d* (FIG. 2B) if LA18 334 is logic 'L', LA3 332 is logic 'H' and LA2 330 is logic 'H', and selects logical block 202*h* (FIG. 2B) if LA18 334 is logic 'H', LA3 332 is logic 'H' and LA2 330 is logic 'H'.

Mapper logic 304 selects one of the binary macro cells 204, 206 dependent on the state of LA3 332 and LA2 330. Binary macro cell 204 is selected through enable 326 if LA3 332 and LA2 330 are not both logic 'H'. Binary macro cell 206 is selected through enable 326 if both LA3 332 and LA2 330 are logic 'H'. To read a 21-bit mapper entry 420 (FIG. 1C) stored in either of the binary macro cells 204, 206, all 256 bits in the selected logical row in the binary macro cell 204, 206 selected by logical address bits LA18:LA4 314 or LA17:LA4 312 are output on the respective data bus 316, 318. Data bus 316 includes 252 bits of the 256 bits stored per logical row 214 (FIG. 2B) in binary macro cell 204. Data bus 318 includes 168 bits of the 256 bits stored per logical row 214 (FIG. 2B) in binary macro cell 206. Each data bus 316, 318 is coupled to a respective multiplexor 306, 308. The data bus 316 from binary macro cell 204 is coupled to multiplexor 306. The data bus 318 from binary macro cell 206 is coupled to multiplexor 308. The least significant four bits (LA3:LA0 322 or MA3:MA2 320 and LA1:LA0 328) of the logical address select one of the sixteen 21-bit mapper entries 420 in the selected logical row through one of the respective multiplexors 306, 308.

Multiplexor 306 selects one of twelve 21-bit mapper entries 420 stored for the data structure in a logical row in binary macro cell 204. The 21-bit mapper entry 420 selected in binary macro cell 204 is dependent on the state of logical address bits LA3:LA0 322 as shown in Table 1 below:

TABLE 1

| LA3 | LA2 | LA1 | LA0 | Data bits selected from D251:D0 |
|---|---|---|---|---|
| L | L | L | L | D20:0 |
| L | L | L | H | D41:21 |
| L | L | H | L | D62:22 |
| L | L | H | H | D83:23 |
| L | H | L | L | D104:144 |
| L | H | L | H | D125:145 |
| L | H | H | L | D146:146 |
| L | H | H | H | D167:147 |
| H | L | L | L | D188:168 |
| H | L | L | H | D209:189 |
| H | L | H | L | D230:210 |
| H | L | H | H | D251:231 |

Mapper logic 304 maps logical address bits LA3 332 and LA2 330 to mapped address bits MA3 and MA2 320 dependent on the state of LA18 as shown in Table 2 below:

TABLE 2

| Logical Address | | | Mapped Address | | |
|---|---|---|---|---|---|
| LA18 | LA3 | LA2 | MA3 | MA2 | Logical Block |
| L | H | H | L | L | 202d (FIG. 2A) |
| H | H | H | H | L | 202h (FIG. 2A) |

As shown above, logical memory block 202*h* (FIG. 2B) in binary macro cell 206 is selected if logical address bit LA3 332 is logic 'H'; LA2 330 is logic 'H' and LA18 334 is logic 'H'. Logical memory block 202*d* (FIG. 2B) in binary macro cell 206 is selected if logical address bit LA3 332 is logic 'H'; LA2 330 is logic 'H' and LA18 334 is logic 'L'.

Multiplexor 308 selects one of eight 21-bit mapper entries 420 (FIG. 1C) stored per logical row in binary macro cell 206. A 21-bit mapper entry 420 (FIG. 1C) is selected in the selected logical block 202*d* (FIG. 2A), 202*h* (FIG. 2A) in the selected logical row in binary macro cell 206 through multiplexor 308 as shown in Table 3 below:

TABLE 3

| Address | | | | |
|---------|-----|-----|-----|-----|
| MA3 | MA2 | LA1 | LA0 | Data bits selected from D167:D0 |
| L | L | L | L | D20:0 |
| L | L | L | H | D41:21 |
| L | L | H | L | D62:22 |
| L | L | H | H | D83:23 |
| H | L | L | L | D104:144 |
| H | L | L | H | D125:145 |
| H | L | H | L | D146:146 |
| H | L | H | H | D167:147 |

Thus, mapper logic 304 maps logical addresses to logical blocks in binary macro cells 206, 204 as shown in Table 4 below.

TABLE 4

| Logical Address | | | Cell | Mapped Address | | |
|------|-----|-----|--------|-----|-----|------|
| LA18 | LA3 | LA2 | Enable | MA3 | MA2 | Logical Block |
| L | L | L | H | L | L | 202a (FIG. 2A) |
| L | L | H | H | L | H | 202b (FIG. 2A) |
| L | H | L | H | H | L | 202c (FIG. 2A) |
| L | H | H | L | L | L | 202d (FIG. 2A) |
| H | L | L | H | L | L | 202e (FIG. 2A) |
| H | L | H | H | L | H | 202f (FIG. 2A) |
| H | H | L | H | H | L | 202g (FIG. 2A) |
| H | H | H | L | H | L | 202h (FIG. 2A) |

In binary memory 204, 128K bits ($2^{15} \times 4$ bits, where 4 is the difference between the 256 bits provided and the 252 bits used to store twelve 21-bit mapper entries 420) are not accessible by the logical memory address. In binary macro cell 206, 1.4 Mega bits (215×88 bits, where 88 is the difference between the 256 bits provided and the 188 bits used to store eight 21-bit mapper entries 420) are not accessible by the logical memory address. The percentage of inaccessible memory is 12.5% (1.5M/12M×100%). Thus, the invention decreases the amount of inaccessible memory in the binary macro cells used for storing non-binary data structures.

Figure 4:
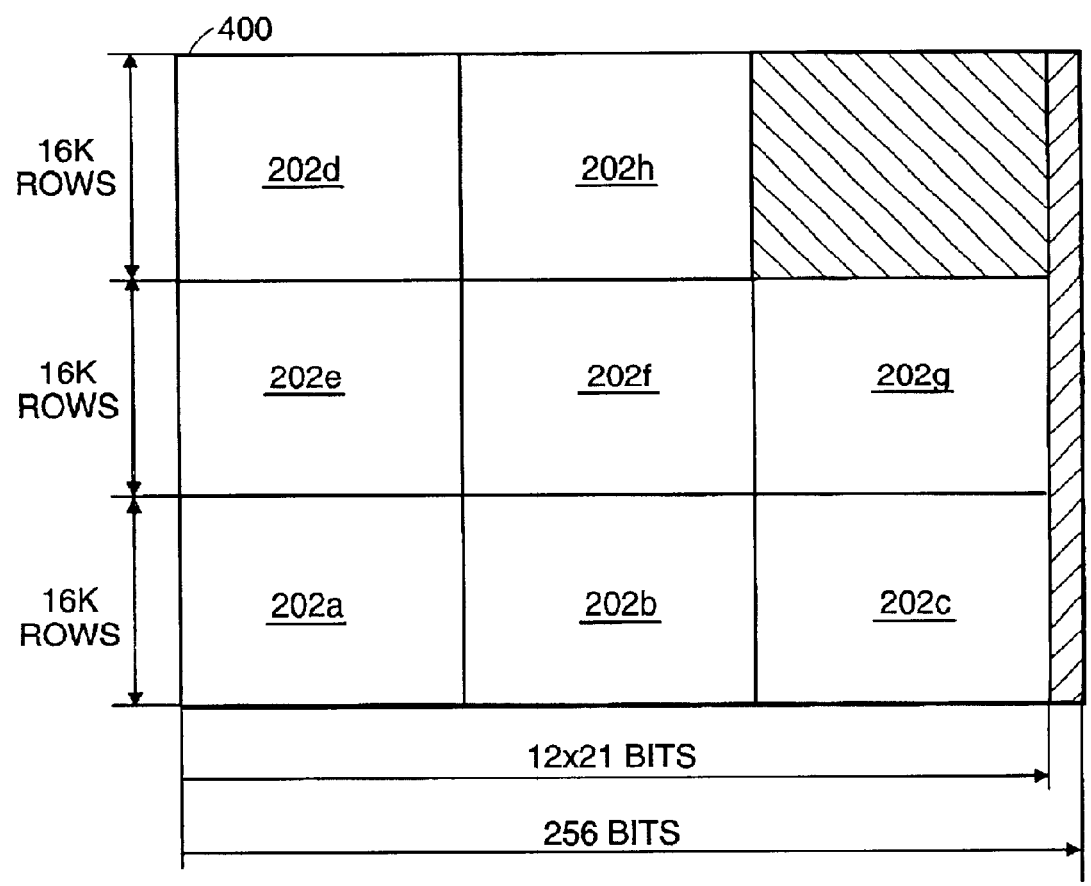
FIG. 4 illustrates the subtree memory including a single memory macro cell for storing a non-binary data structure according to the principles of the preset invention.

FIG. 4 illustrates the subtree memory including a single memory macro cell for storing a non-binary data structure according to the principles of the present invention. In the alternative embodiment shown in FIG. 4, the logical memory shown in FIG. 2B can be implemented as a single macro cell 400.

For example, a 48K×256 macro cell with a non-binary number of logical rows (48K) and a binary width (256 ($2^8$)) can be substituted for the 32K×256 binary macro cell 204 and the 16K×256 binary macro cell 206 described in conjunction with FIG. 3. The memory macro cell is logically divided into a 16K×256 binary block and a 32K×256 binary block, with the binary blocks further logically subdivided into binary blocks 202a–g as described in conjunction with FIG. 2B. The mapper logic 304 translates a logical address for an entry stored in logical blocks 202d and 202h to the physical entries stored in the upper 16K logical rows of the macro cell 400.

Figure 5:
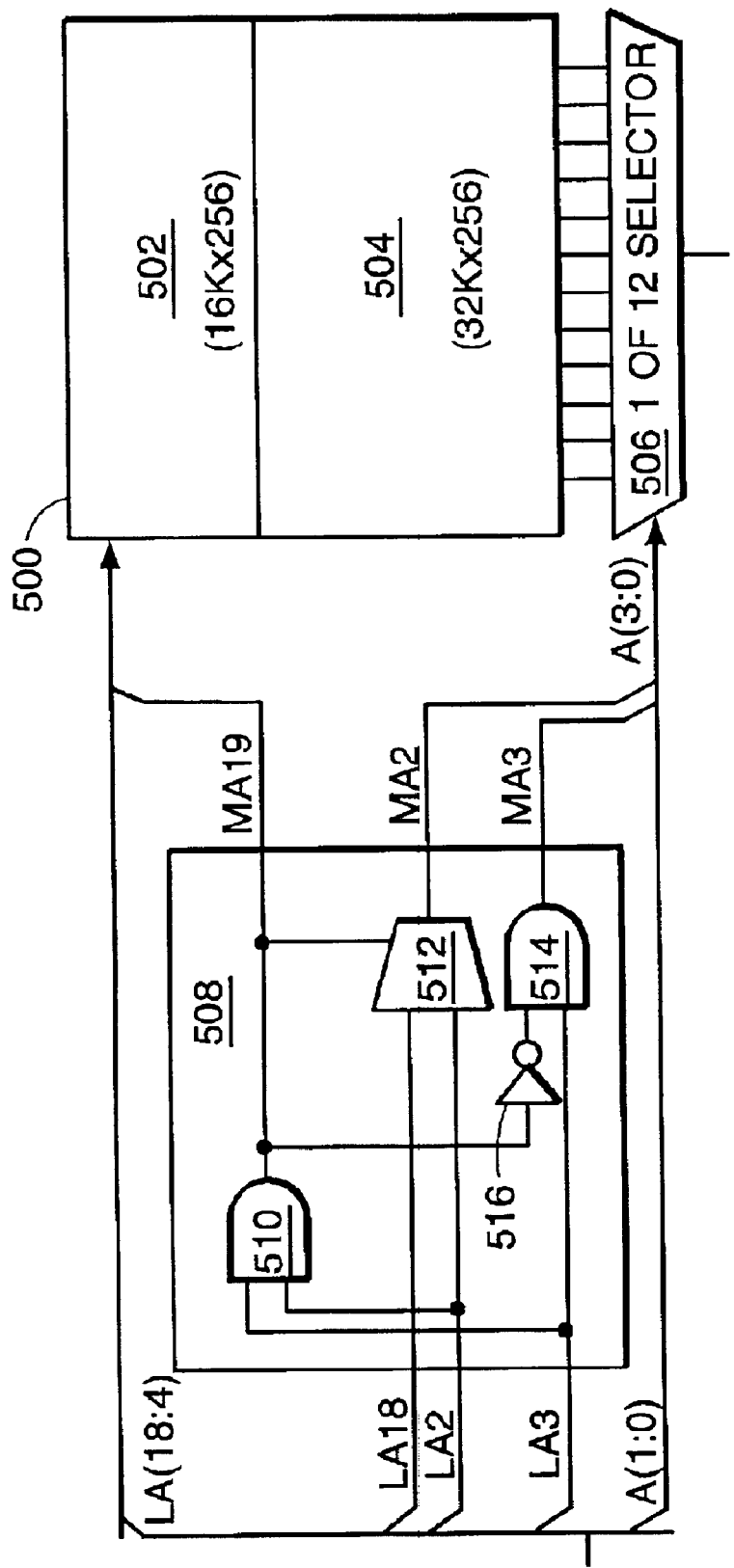
FIG. 5 is another embodiment for mapping the logical view of memory shown in FIG. 2B to the single memory macro cell shown in FIG. 5 or the binary memory macro cells shown in FIG. 3.

FIG. 5 is another embodiment for mapping the logical view of memory shown in FIG. 2B to the single memory macro cell shown in FIG. 4 or the binary memory macro cells 204, 206 shown in FIG. 3. The embodiment is described for the memory macro cell 400 shown in FIG. 4 which includes 48K×256 bits. The memory macro cell 400 is logically divided into a first binary memory block 504 and a second binary memory block 502. The first binary memory block 504 includes 32K logical rows each including 256 bits. The second binary memory block 502 includes 16K logical rows each including 256 bits.

Logical blocks 202a–202c (FIG. 4) and 202e–g are stored in first binary memory block 504 and logical blocks 202d (FIG. 4) and 202h (FIG. 4) are stored in the second binary memory block 502. Mapper logic 508 maps logical address bits LA18 and LA3–LA2 to mapped address bits MA19–MA18 and MA3–MA2 to map logical blocks 202a–h (FIG. 4) to binary memory blocks 502, 504.

Mapper logic 508 includes AND gate 510, multiplexor 512, invertor 516 and AND-gate 514. The mapper logic 508 sets MA19 to logic 'H' if both LA3 and LA4 are logic 'H' through AND gate 510. The state of MA19 selects LA18 or LA12 output as MA2 from multiplexor 512. While MA19 is 'H', MA3 is set to logic 'L' through invertor 516 and AND-gate 514. Thus, MA19 is 'H' to select the upper 16K rows in the memory macro cell 500 while LA3 and LA2 are both 'H' to map logical blocks 202d (FIG. 2B) and 202h (FIG. 2B) to binary block 502 as shown in Table 5 below.

TABLE 5

| Logical Address | | | | Mapped Address | | | Binary |
|------|-----|-----|------|-----|-----|---------------|-------|
| LA18 | LA3 | LA2 | MA19 | MA3 | MA2 | Logical Block | Block |
| L | H | H | H | L | L | 202d (FIG. 2B) | 502 |
| H | H | H | H | L | H | 202h (FIG. 2B) | 502 |

The invention has been described for storing a non-binary data structure in a 256 bit wide memory. However, the invention is not limited to a 256 bit wide memory. The invention applies to storing a portion of a non-binary data structure per logical row in a memory. For example, the invention can also be used to store a non-binary width data structure in a 128-bit wide memory.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for storing a non-binary width data structure per logical row in a memory comprising the steps of:

segmenting the non-binary width data structure into plural segments and physically mapping the segments into a memory structure smaller than would be required for the non-binary width data structure without segmenting; and mapping a logical address into the physically arranged plural segments, the logical address identifying a single logical row in the memory for storing one non-binary width data structure.

2. The method as claimed in claim 1 wherein the segments are the same size.

3. The method as claimed in claim 2 wherein the width of the segment is 21-bits, and the non-binary width data structure has 16 segments.

4. An apparatus for storing a non-binary width data structure, the apparatus comprising:

memory, and mapper logic which segments the non-binary width data structure into plural segments, physically maps the non-binary width data structure into the memory, the memory smaller than would be required for the non-binary width data structure without segmenting and maps a logical address into the physically arranged plural segments, the logical address identifying a single logical row in the memory for storing one non-binary width data structure.

5. The apparatus as claimed in claim 4 wherein the segments are the same size.

6. The apparatus as claimed in claim 5 wherein the width of the segment is 21-bits, and the non-binary width data structure has 16 segments.

7. An apparatus for storing a non-binary width data structure per logical row, the non-binary width data structure including a plurality of entries, the memory comprising:

a first binary memory block having $2^n$ logical rows, each first binary memory block logical row storing a portion of the non-binary width data structure;

a second binary memory block having $2^{n-1}$ logical rows, each second binary memory block logical row storing a first other portion of the non-binary width data structure for the first $2^{n-1}$ logical rows of the first binary memory block and a second other portion of the non-binary width data structure for the second $2^{n-1}$ logical rows of the first binary memory block; and mapper logic which maps a logical address identifying a logical row and an entry in the logical row to a physical address for the entry in the first binary memory block or the second binary memory block.

8. The apparatus as claimed in claim 7 wherein the portion of the non-binary width data structure stores twelve entries, the first other portion stores four entries and the second other portion stores four entries.

9. The apparatus as claimed in claim 8 wherein the width of the entry is 21-bits, the non-binary width data structure stores 16 entries and n is 15.

10. The apparatus as claimed in claim 7 wherein the first binary memory block and the second binary memory block are binary macro cells.

11. The apparatus as claimed in claim 7 wherein the first binary memory block and the second binary memory block are portions of a memory macro cell.

12. The apparatus as claimed in claim 7 comprising:

a multiplexor which selects the entry in the logical row.

13. A method for storing a non-binary width data structure per logical row in a memory, the non-binary width data structure including a plurality of entries, the method comprising the steps of:

providing a first binary memory block, the first binary memory block including $2^n$ logical rows;

providing a second binary memory block, the second binary memory block including $2^{n-1}$ logical rows;

mapping a logical address identifying a logical row and an entry in the logical row to a physical address for the entry stored in a single location in the first binary memory block or the second binary memory block;

storing a portion of the non-binary width data structure in a first binary memory block logical row; and storing a first other portion of the non-binary width data structure for the first $2^{n-1}$ logical rows of the first binary memory block and a second other portion of the non-binary width data structure for the second $2^{n-1}$ logical rows of the first binary memory block in a second binary memory block logical row.

14. The method as claimed in claim 13 wherein the portion of the non-binary width data structure stores twelve entries, the first other portion stores four entries and the second other portion stores four entries.

15. The method as claimed in claim 14 wherein the width of the entry is 21-bits, the non-binary data structure stores 16 entries and n is 15.

16. The method as claimed in claim 13 wherein the first binary memory block and the second binary memory block are binary macro cells.

17. The apparatus as claimed in claim 13 wherein the first binary memory block and the second binary memory block are portions of a memory macro cell.

18. An apparatus for storing a non-binary width data structure per logical row, the non-binary width data structure including a plurality of entries, the apparatus comprising:

a first binary memory block having $2^n$ logical rows, each first binary memory block logical row storing a portion of the non-binary width data structure;

a second binary memory block having $2^{n-1}$ logical rows, each second binary memory block logical row storing a first other portion of the non-binary width data structure for the first $2^{n-1}$ logical rows of the first binary memory block and a second other portion of the non-binary width data structure for the second $2^{n-1}$ logical rows of the first binary memory block; and means for mapping a logical address identifying a logical row and an entry in the logical row to a physical address for the entry in the first binary memory block or the second binary memory block.

19. The apparatus as claimed in claim 18 wherein the portion of the non-binary width data structure stores twelve entries, the first other portion stores four entries and the second other portion stores four entries.

20. The apparatus as claimed in claim 19 wherein the width of the entry is 21-bits, the non-binary width data structure stores 16 entries and n is 15.

21. The apparatus as claimed in claim 18 wherein the first binary memory block and the second binary memory block are binary memory macro cells.

22. The apparatus as claimed in claim 18 farther comprising:

means for selecting the entry in the logical row.

23. The apparatus as claimed in claim 18 wherein the first binary memory block and the second binary memory block are portions of a memory macro cell.

* * * * *